United States Patent [19]

Tanner

[11] Patent Number: 4,858,315
[45] Date of Patent: Aug. 22, 1989

[54] SHIELD STRIPPING APPARATUS FOR ELECTRICAL CABLE

[75] Inventor: John G. Tanner, Oklahoma City, Okla.

[73] Assignee: N. J. Wheeler, Oklahoma City, Okla.

[21] Appl. No.: 191,358

[22] Filed: May 9, 1988

[51] Int. Cl.⁴ .............................. H02G 1/12
[52] U.S. Cl. ........................ 30/90.4; 81/9.44
[58] Field of Search ............... 30/90.4, 90.6, 90.7, 30/92.5; 81/9.44, 9.4

[56] References Cited

U.S. PATENT DOCUMENTS

| | | | |
|---|---|---|---|
| 3,623,384 | 11/1971 | Murphy | 30/90.6 |
| 4,027,557 | 6/1977 | Stepan | 81/9.5 |
| 4,059,893 | 11/1977 | Solury | 30/90.1 |
| 4,117,749 | 10/1978 | Economu | 30/90.6 |
| 4,543,717 | 10/1985 | Luka | 30/90.6 |
| 4,557,163 | 12/1985 | Tanner | 81/9.44 |
| 4,665,616 | 5/1987 | Orecchio | 30/90.4 |

Primary Examiner—Roscoe V. Parker
Attorney, Agent, or Firm—Laney, Dougherty, Hessin & Beavers

[57] ABSTRACT

A shield stripping apparatus for stripping an outer shield from an electrical cable. The apparatus includes a housing with a shaft rotatably mounted therein. A cable guide head is removably attached to the shaft and includes a wire receiving and guiding aperture therethrough. The guide head further defines a transverse blade receiving groove or slot adjacent the aperture. A cutting blade is pivotally mounted in the slot and may be pivoted through an angle of approximately 90° between a retracted position and a cutting position. In the cutting position, a cutting edge on the blade extends into the aperture for engaging and cutting the outer shielding of the cable. During the cutting operation, the cable is pulled through the guide head. Because the guide head and shaft are free to rotate, the blade will be guided along spirally wound wires within the shield such that the guide head and shaft rotate as the cable is pulled therethrough. In the cutting position, a free end of the blade engages a shoulder on the guide head which prevents over-rotation of the blade and holds the blade in the cutting position as the cable is pulled through the aperture.

20 Claims, 1 Drawing Sheet

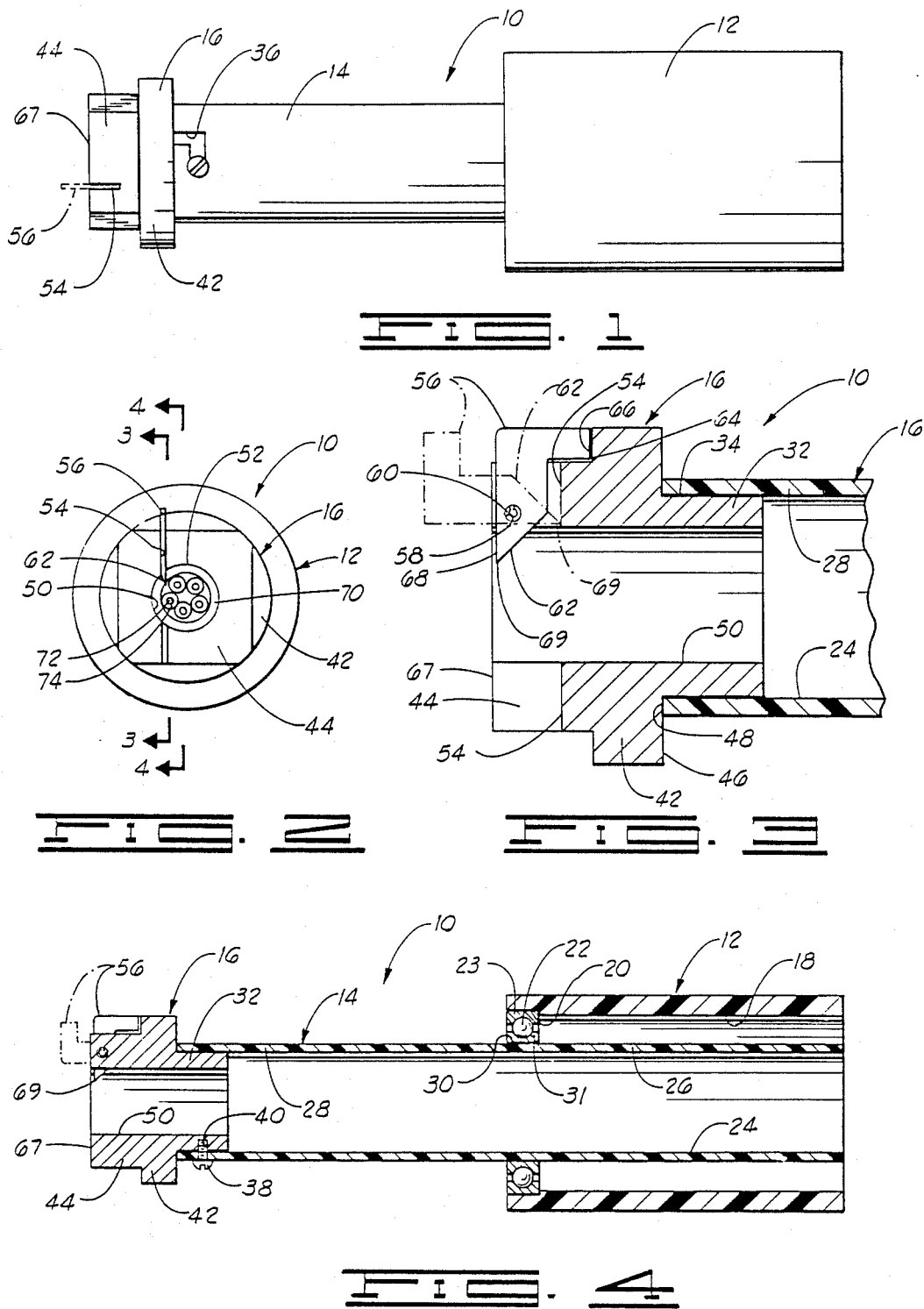

SHIELD STRIPPING APPARATUS FOR ELECTRICAL CABLE

BACKGROUND OF THE INVENTION

1. Field Of The Invention

This invention relates to apparatus for stripping an outer shield from an electrical cable, and more particularly, to a shield stripping apparatus having a cutting blade pivoted in a plane parallel to a longitudinal axis of the cable.

2. Description Of The Prior Art

Stripping the outer shield from an electrical cable without cutting the insulation on the internal wires therein is a procedure which is normally done by hand and results in high labor costs. One apparatus devised to provide longitudinal cutting of an external shield of an electrical cable is shown in U.S. Pat. No. 3,623,384 to Murphy which includes a cable receiving housing with a pivoted blade therein. The blade is spring loaded outwardly away from a central opening of the housing, and external pressure must be applied to the blade to keep it in a cutting position.

Another wire stripper which can cut longitudinally along a cable is disclosed in U.S. Pat. No. 4,117,749 to Economu. This apparatus includes a body with pivoted jaws which hold cutting blades therein. The jaws are springingly biased away from the cable, and thus also require external pressure thereon to maintain the blades in a cutting position.

While the Murphy and Economu apparatus allow longitudinal cuts along a cable, the requirement of external pressure may result in uneven cutting along the outer shield. Also, the internal wires within the outer shield are usually wound in a spiral or helix, and these prior apparatus are not well adapted for following the internal wires within the shield. Thus, there is a possibility of undesired cutting of the internal wires.

There is therefore a need for an apparatus which applies constant cutting pressure on an outer shield of a cable while allowing the blade to rotate to follow the internal wires as the cable is pulled therethrough, thus compensating for the spiral wind of the internal wires and lessening the likelihood of cutting the insulation on those wires. The present invention which includes a pivoted blade which is positively held in a cutting position, requiring no external pressure thereon, and which allows the cutting head to rotate as the cable is pulled therethrough provides a solution to these problems.

SUMMARY OF THE INVENTION

The shield stripping apparatus of the present invention is adapted for stripping the outer shielding from an electrical cable and comprises cable guiding means for receiving and guiding the cable, cutting means on the guiding means for cutting the shield in a substantially longitudinal direction as the cable is moved along the cable guiding means when the cutting means is in a cutting position, and stop means for holding the cutting means in the cutting position as the cable is moved. The shield stripping apparatus further comprises housing means and shaft means rotatably mounted on the housing means. The cable guiding means is removably attached to the shaft means.

The cable guiding means is characterized by a guide head defining a cable receiving aperture therethrough and a blade receiving slot or groove adjacent the aperture. Preferably, the cable guiding means is one of a plurality of interchangeable cable guiding means.

The cutting means is characterized by a blade pivotally disposed in the slot in the guide head and having a cutting surface thereon. When the blade is in the cutting position, the cutting surface faces in a direction opposite the direction of movement of the cable during the cutting operation. As the cable is moved toward the blade cutting surface, the cable outer shield is cut. The blade is substantially parallel to the direction of movement of the cable and is preferably spaced from the central axis of the aperture in the guide head.

The blade also has a retracted position adjacent the aperture, and in the preferred embodiment, the blade is moved through an angle of approximately 90° between the retracted and cutting positions.

The stop means comprises a shoulder on the guide head and a surface on the blade which engages the shoulder when the blade is in the cutting position. As the cable is pulled through the guide head during a cutting operation, the surface of the blade is forced against the shoulder on the guide head, thus preventing further pivotation of the blade beyond the cutting position and thereby rigidly holding the blade in the cutting position during a cutting operation.

During the cutting operation, the guide head, the blade carried by the guide head, and the shaft to which the guide head is attached are free to rotate with respect to the housing. As the cable is pulled through the guide head, the blade is guided by internal wires within the shield. Normally, these internal wires are spirally or helically wound, and thus the guide head and shaft will rotate as the cable is pulled therethrough. In this way, a spiral or helical, but substantially longitudinal, cut is made in the outer shield. Because the blade follows the internal wires, the insulation on the internal wires is not cut during the operation.

It is an object of the present invention to provide a shield stripping apparatus for stripping the outer shield from an electrical cable without damaging the insulation on internal wires therein.

Another object of the invention is to provide a shield stripping apparatus which has a guide head and cutting blade which will rotate to follow helically or spirally wound internal wires within the cable to be stripped.

An additional object of the invention is to provide a shield stripping apparatus having cutting means for cutting the outer shield of a cable and having stop means for holding the cutting means in a cutting position during a cutting operation.

Still another object of the invention is to provide a shield stripping apparatus with a blade pivoted through approximately 90° between retracted and cutting positions.

Additional objects and advantages of the invention will become apparent as the following detailed description of the preferred embodiment is read in conjunction with the drawings which illustrate such preferred embodiment.

BRIEF DESCRIPTION OF THE DRAWINGS

FIG. 1 shows a side view of the shield stripping apparatus of the present invention with the cutting blade shown in a horizontal position.

FIG. 2 shows a guide head end view of the apparatus with the cutting blade in a vertical position.

FIG. 3 is a partial cross section taken along lines 3—3 in FIG. 2.

FIG. 4 is a cross-sectional view taken along lines 4—4 in FIG. 2.

DESCRIPTION OF THE PREFERRED EMBODIMENT

Referring now to the drawings, and more particularly to FIG. 1, the shield stripping apparatus of the present invention is shown and generally designated by the numeral 10. Shield stripping apparatus 10 includes housing means in the form of a substantially cylindrical housing 12, shaft means characterized by a substantially cylindrical shaft 14, and cable guiding means in the form of a cable guide head 16.

Referring now to FIG. 4, housing 12 includes a central opening 18 extending longitudinally therethrough. Central opening 18 includes a bearing bore 20 in which is disposed bearing means. The bearing means may be of any kind known in the art, but is preferably in the form of a ball bearing 22 with an outer race 23 engaged with bearing bore 20. Shaft 24 defines a central opening 24 therethrough, and the shaft includes a first portion 26 extending into central opening 18 of housing 12 and a second portion 28 extending outwardly from the housing and away from bearing 22. Outer surface 30 of shaft 14 is mounted in inner race 31 of bearing 22, and it will be seen by those skilled in the art that shaft 14 is thus rotatably mounted in housing 12.

Referring now also to FIG. 3, guide head 16 includes a substantially cylindrical collar portion 32 which extends into second portion 28 of shaft 14. Collar portion 32 has an outside surface 34 with a diameter dimensioned for close relationship with the inside diameter of central opening 24 in shaft 14. Shaft 14 also defines a substantially L-shaped slot 36 therein through which is disposed a set screw 38 which is threadingly engaged with a hole 40 in collar portion 32 of guide head 16. Thus, guide head 16 may be removably attached to shaft 14, and it will be seen by those skilled in the art that guide head 16 may be detached from shaft 14 by merely loosening screw 38. It is not necessary to remove screw 38.

Guide head 16 also includes a substantially cylindrical intermediate flange portion 42 and a blade holding portion 44 of substantially square cross section extending from flange portion 42 in a direction opposite collar portion 32 and away from shaft 14. When guide head 16 is positioned on shaft 14 as shown in the drawings, a substantially planar side 46 of flange portion 42 is adjacent end 48 of the shaft.

Guide head 10 defines a cable receiving and guiding aperture 50 therethrough which is in communication with central opening 24 of shaft 14 and is adapted and sized for receiving a cable 52, as shown in FIG. 2. For typical cables, aperture 50 is substantially cylindrical and is longitudinally coaxial with central opening 24 of shaft 14.

Blade holding portion 44 of guide head 16 defines a slot or groove 54 therein which extends in a plane parallel to the longitudinal central axis of aperture 50 in the guide head and central opening 24 in shaft 14. Disposed in a portion of groove 54 is a thin, substantially flat cutting blade 56 of substantially L-shaped configuration. Blade 56 is pivotally mounted in groove 54 and pivots about a pin 58 disposed in a transverse hole 60 in guide head 16. Hole 60 extends substantially perpendicular to groove 54.

As best shown in FIG. 3, blade 56 is pivotable through an angle of approximately 90° between a cutting position shown in solid lines and a retracted position shown in phantom lines. In the cutting position, a beveled cutting edge or surface 62 extends into aperture 50 at a cutting angle of approximately 45° from the central axis of aperture 50. Cutting edge 62 generally faces toward shaft 14. When in this cutting position, a free end or surface 64 of blade 56 is engaged with a shoulder 66 on flange portion 42 of guide head 16. By pivoting blade 56 through the 90° angle to the retracted position, it will be seen that no portion of blade 56 will extend into aperture 50 and free end 64 of the blade is spaced from guide head 16.

OPERATION OF THE APPARATUS

When using shield stripping apparatus 10 to strip the outer shield from a cable, such as cable 52, the cable is inserted into cable receiving aperture 50 in a direction from outer end 67 of blade holding portion 44 of guide head 16 toward shaft 14. This is in a right-hand direction as seen in FIGS. 1, 3 and 4. If blade 56 is in the retracted position, the cable will simply slide through aperture 50. If blade 56 is in the cutting position, cable 52 will contact back edge 68 of the blade, and move blade 56 to the retracted position. Blade 56 freely pivots and no significant amount of force is required to move it.

Once the desired length of cable 52 is inserted, the operator pivots blade 56 to the cutting position such that point 69 of the blade pierces outer shield 70 of the cable. As seen in FIG. 2, cable 52 has a plurality of wires 72 disposed within shield 70, each of the wires having an individual outer insulation 74. Normally, wires 72 are helically or spirally wound with one another within shield 70 of cable 52. Blade 56 is adapted such that when in the cutting position, cutting edge 62 will not easily pierce or cut insulation 74 on any wire 72. However, blade 56 will be adjacent and guided by insulation 74 on at least one of wires 72. In the embodiment shown herein, cavity 54 and blade 56 therein are parallel to, and spaced from, the central axis of aperture 50. However, the exact relationship between blade 50 and the central axis may vary as desired.

To strip cut outer shield 70, cable 52 is pulled away from shaft 14 (in a leftward direction as shown in FIGS. 1, 3 and 4) while housing 12 is held stationary by the user of the apparatus, thus moving the cable toward cutting edge 62 of blade 56 which acts as a cutting means to cut shield 70.

It will be seen that the movement of cable 52 during a cutting operation is in substantially the same direction as the direction of pivotation of blade 56 from the retracted to the cutting position. Thus, blade 56 is forced toward the cutting position during a cutting operation. In turn, free end or surface 64 of blade 56 is forced against shoulder 66 on guide head 16. Thus, free end 64 and shoulder 66 provide stop means to prevent overrotation of blade 56 and to rigidly hold the blade in the cutting position as the cable is moved.

The user does not touch guide head 16 or shaft 14 during the cutting or stripping process. As cable 52 is withdrawn, blade 56 will be guided by helically wound wires 72 which thus causes guide head 16, and shaft 14 to which the guide head is attached, to rotate with respect to housing 12. The movement of cable 52 is continued until the cable exits from aperture 50 adjacent outer end 67 of blade holding portion 44. Thus, a substantially longitudinal, helical cut will be made in outer shield 70. The cut portion of the shield is then removed from cable 52 in a manner known in the art so that wires 72 will be exposed as desired. Insulation 74 from each wire 72 may then be individually stripped for subsequent electrical connection.

Guide head 16 is preferably one of a plurality of interchangeable guide heads, each of which being adapted for different size and type of cable 52. The size of aperture 50, the amount cutting edge 62 of blade 56 extends into aperture 50, and the transverse positioning of blade 56 with respect to the central axis of aperture 50 may all be varied to accommodate different cable configurations as desired.

It can be seen, therefore, that the shield stripping apparatus of the present invention is well adapted to carry out the ends and advantages mentioned, as well as those inherent therein. While a presently preferred embodiment of the invention has been described for the purposes of this disclosure, numerous changes in the construction and arrangement of the parts can be made by those skilled in the art. All such changes are encompassed within the scope and spirit of this invention as defined by the appended claims.

What is claimed is:

1. A stripper for removing a shield from a cable, said stripper comprising:
    cable guiding means for receiving and guiding said cable;
    cutting means movable between a retracted position and a cutting position and being pivotally affixed on said guiding means for cutting said shield in a substantially longitudinal direction as said cable is moved along said cable guiding means when said cutting means is in a cutting position; surface means on said cutting means responsive to insertion of said cable for moving said cutting means to said retracted position, and
    stop means for holding said cutting means in said cutting position as said cable is moved.

2. The stripper of claim 1 further comprising:
    housing means; and
    shaft means rotatably mounted on said housing means;
    wherein, said cable guiding means is attached to said shaft means.

3. The stripper of claim 2 wherein said cable guiding means is one of a plurality of interchangeable cable guiding means.

4. The stripper of claim 1 wherein:
    said cable guiding means is characterized by a guide head defining a cable receiving aperture therethrough and a blade receiving slot adjacent said aperture; and
    said cutting means is characterized by a blade pivotally disposed in said slot and having a cutting surface thereon, said cutting surface facing in a direction opposite a direction of movement of said cable during said cutting operation.

5. The stripper of claim 4 wherein said stop means comprises:
    a shoulder on said guide head; and
    a surface on said blade engaging said shoulder when said blade is in said cutting position.

6. A shield stripping apparatus for removing a shield from a cable, said apparatus comprising:
    a cable guide head defining a cable receiving aperture therein for receiving and guiding movement of said cable; and
    a blade pivotally attached to said guide head and disposed substantially parallel to a direction of movement of said cable in said aperture, said blade having a cutting position, in which a cutting edge of said blade extends into said aperture for engaging and cutting said shield of said cable as said cable is moved, and a retracted position;
    wherein, a portion of said blade is engaged by said cable upon insertion for pivoting said blade to said retracted position; and a further portion of said blade stoppingly engages a portion of said head as said cable is moved when said blade is in said cutting position, thereby rigidly holding said blade in said cutting position.

7. The apparatus of claim 6 wherein, as said blade is pivoted from said retracted position to said cutting position, said blade is moved in substantially the same direction as said cable is moved during the cutting operation.

8. The apparatus of claim 6 wherein said blade is moved through an angle of approximately 90° between said retracted and cutting positions.

9. The apparatus of claim 6 wherein said blade is spaced from a central axis of said aperture.

10. The apparatus of claim 6 further comprising:
    a housing; and
    a shaft rotatably disposed in said housing;
    wherein, said head is attached to said shaft and rotatable therewith.

11. The apparatus of claim 10 further comprising bearing means disposed between said housing and shaft.

12. The apparatus of claim 10 wherein said head is one of a plurality of heads adapted for receiving a variety of cables.

13. A shield stripping apparatus for stripping an outer shield from a cable, said apparatus comprising:
    a housing;
    bearing means disposed in said housing;
    a shaft having a first portion mounted on said bearing means for rotation with respect to said housing and further having a second portion;
    a guide head attached to said second portion of said shaft, said guide head having a shoulder thereon and defining a cable guide aperture therethrough substantially coaxial with said shaft, said aperture being adapted for axial movement of said cable therethrough, said guide head further defining a blade groove therein in communication with said aperture; and
    a blade pivotally mounted in said blade groove and pivotal between a cutting position, wherein a cutting edge of said blade extends into said aperture and faces in a direction substantially toward said shaft and opposite a direction of movement of said cable during a cutting operation, and a retracted position adjacent said aperture, said blade having a surface engaged by said cable upon insertion for pivoting said blade to said retracted position, said blade further having an end spaced from said cutting edge and engageable with said shoulder on said head when in said cutting position.

14. The apparatus of claim 13 wherein said head is detachable from said shaft and is one of a plurality of heads adapted for different cable sizes.

15. The apparatus of claim 13 wherein said blade is spaced from, and parallel to, a central axis of said aperture.

16. The apparatus of claim 13 wherein said blade pivots through an angle of approximately 90° between said cutting and retracted positions.

17. The apparatus of claim 13 wherein said cutting edge of said blade extends at an angle of approximately 45° to an axis of said aperture.

18. The apparatus of claim 13 wherein said end of said blade extends outwardly from said groove.

19. The apparatus of claim 13 wherein said bearing means is characterized by a ball bearing.

20. The apparatus of claim 13 wherein said housing and shaft are of substantially cylindrical configuration.

* * * * *